(12) United States Patent
Tenka

(10) Patent No.: US 7,373,898 B1
(45) Date of Patent: May 20, 2008

(54) POINTER WITH ONE-PIECE HUB DEVICE

(75) Inventor: Franky Tenka, Ypsilanti, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 11/603,084

(22) Filed: Nov. 22, 2006

(51) Int. Cl.
*G01D 13/28* (2006.01)
*G01D 11/28* (2006.01)
*G12B 11/04* (2006.01)

(52) U.S. Cl. .................. 116/328; 116/288; 116/DIG. 6

(58) Field of Classification Search ............... 116/62.1, 116/62.4, 286, 287, 288, 328, 332, DIG. 5, 116/DIG. 6, DIG. 36; 362/23, 28, 29, 30
See application file for complete search history.

(56) References Cited

U.S. PATENT DOCUMENTS

| | | | |
|---|---|---|---|
| 4,625,262 A | 11/1986 | Sakakibara et al. | |
| 4,723,504 A * | 2/1988 | Griffin et al. ............... | 116/332 |
| 4,860,170 A | 8/1989 | Sakakibara et al. | |
| 5,003,914 A | 4/1991 | Mayer | |
| 5,143,434 A | 9/1992 | Ohta et al. | |
| 5,291,851 A | 3/1994 | Muramatsu | |
| 5,603,283 A | 2/1997 | Owen | |
| 6,302,552 B1 | 10/2001 | Ross et al. | |
| 6,820,991 B2 | 11/2004 | Wakaki et al. | |
| 6,955,438 B2 | 10/2005 | Ishii | |

FOREIGN PATENT DOCUMENTS

| | | | |
|---|---|---|---|
| DE | 3435377 | | 9/1985 |
| EP | 0578430 A1 | | 1/1994 |
| JP | 03048726 A | * | 3/1991 |
| JP | 6082274 | | 3/1994 |
| JP | 06230157 A | * | 8/1994 |
| JP | 6288793 | | 10/1994 |
| JP | 2000304577 A | * | 11/2000 |
| JP | 2002107188 A | * | 4/2002 |

* cited by examiner

*Primary Examiner*—R. A. Smith
(74) *Attorney, Agent, or Firm*—Daniel R. Edelbrock

(57) ABSTRACT

A pointer for a display snaps into a hub device. The hub device has a body including a cap, a light shield and a pointer stem molded together as one part. A passage within the body receives an insertion section of the pointer. A latch arm extending into the passage from the body snaps into a slot within the insertion section of the pointer. An area of the insertion section of the pointer is exposed to directed light through a cavity in an underside of the body. The area transmits the light to an indicating section of the pointer. The light shield is arranged on the body to prevent the directed light from reflecting off the hub device onto the display. The pointer stem receives a drive shaft that rotates the hub device and positions the indicating section of the pointer on the display according to measured parameters.

11 Claims, 5 Drawing Sheets

POINTER WITH ONE-PIECE HUB DEVICE

BACKGROUND OF THE INVENTION

1. Field of the Invention

The invention relates in general to pointers for dials or displays and more particularly to a snap-together pointer assembly with a one-piece hub device for securing the pointer to the display and preventing light leakage onto the display.

2. Discussion of Related Art

Prior art FIG. 1 illustrates a typical, three-part pointer and hub assembly, enlarged for clarity. A light shield 12, usually made of an opaque plastic, is formed with a hollow pointer stem 14 for fitting around a drive shaft of a stepper motor used to rotate the pointer and hub assembly. The light shield 12 has two spaced apart apertures 16 and a wider, semi-rectangular opening 18. A separate pointer blade 20, often made of a clear or transparent plastic, has a mounting section 22. The mounting section 22 has a light pick-up area or projection 24 extending from an underside 26 of the mounting section. A periphery of the light pick-up area 24 has the general shape of the opening 18 in the light shield 12. The mounting section 22 has two through-holes 28 about the same size as, and spaced apart the same distance as, the apertures 16 in the light shield 12. A detached, opaque cover or cap 30 is also made from plastic. The cap has a slot 32 similar in width and depth to the shape of the pointer blade 20 where the pointer blade 20 joins the mounting section 22.

As shown in FIG. 2 by a view of the bottom of the completed assembly, the interior of the cap 30 has two spaced apart posts 34 positioned to extend through the apertures 16 in the light shield 12 and the through-holes 28 in the mounting section 22 of the pointer blade 20. The light pick-up area 24 on the underside 26 of the mounting section 22 fits into and extends through the opening 18 in the light shield 12. Protruding ends of the posts 34 are crushed or melted in a heat staking process against an underside of the light shield 12 to hold the three parts together. The pointer stem 14 of the completed assembly then receives a stepper motor drive shaft in an interference or press fit so the pointer blade 20 can be moved about a dial or display to indicate appropriate measured values or parameters. The light pick-up area 24 transmits light from a light source (not shown) directly to the pointer blade 20 while the light shield 12 prevents light from being reflected back onto the display.

The prior art assembly requires three separate parts and a heat staking or similar process to secure the parts together. Reducing the number of parts and replacing the attachment process with a less expensive method would significantly decrease the cost and assembly time in a large volume production.

SUMMARY OF THE INVENTION

Accordingly, it is an object of this invention to provide a one-piece hub device, including a cap, light shield and stem, for a pointer assembly.

Another object of the invention is to enable simple, one-part molding of the entire hub device.

A further object of the invention is to permit snap fastening of a pointer blade to the one-piece hub device to eliminate a more costly and time consuming attachment process.

In carrying out this invention in the illustrative embodiment thereof, a pointer hub device is molded as a single, undivided part. The device includes a body having an upper surface and sides forming a pointer cap. A hollow pointer stem extends at a right angle from an underside of the body for receiving a drive shaft from a stepper motor. The stepper motor rotates the hub device to position an indicating section of a pointer at locations on a dial or display determined by, for example, measured vehicle parameters such as speed or engine temperature.

The hub body has an internal passage accessible through an opening in a side of the body. The passage includes a latch feature for cooperating with a complementary catch or latch feature on an insertion section of the pointer to secure the pointer to the hub device body with a snap or mechanical fit. A cavity in the underside of the hub body exposes an area on the insertion section of the pointer. The area picks up light directed to the pointer from beneath the display and transmits the light to the indicating section of the pointer. A light shield on the hub device body adjacent the underside and cavity prevents the light from being reflected off the body directly onto the display.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
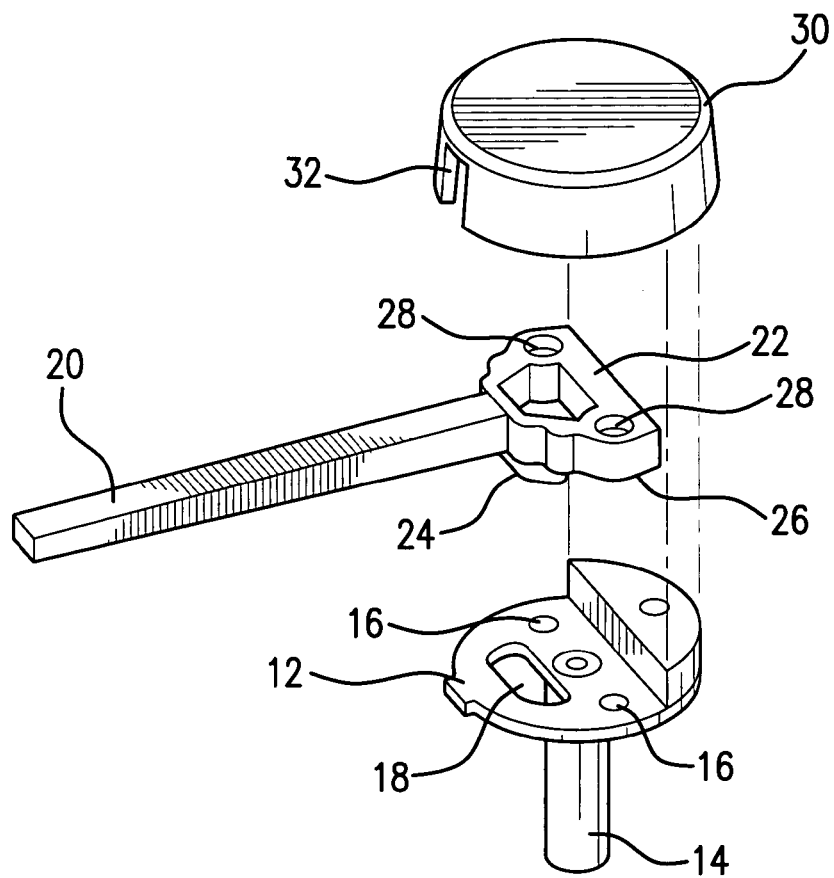
FIG. 1 is an exploded perspective view showing parts of a prior art pointer apparatus.
Figure 2:
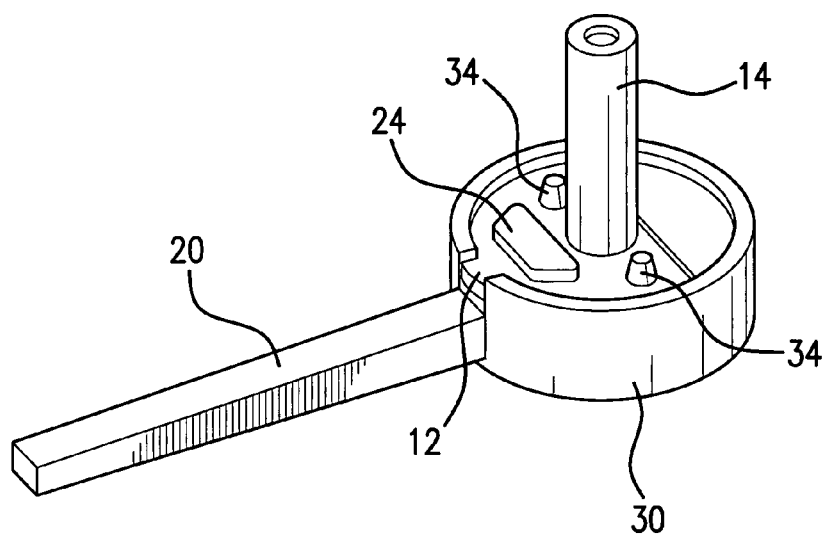
FIG. 2 is a bottom view of the assembled prior art pointer apparatus.
Figure 3:
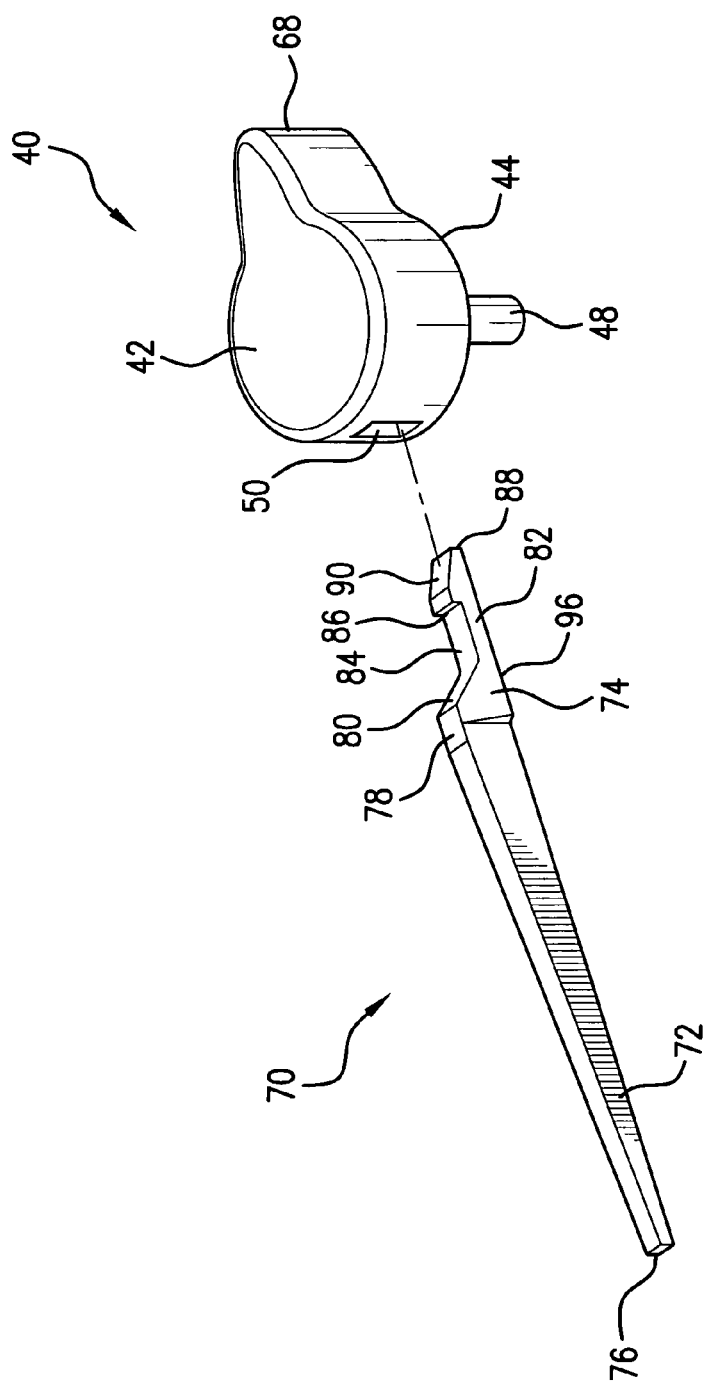
FIG. 3 is an enlarged perspective view of a separated pointer blade and hub device according to the current invention.
Figure 4:
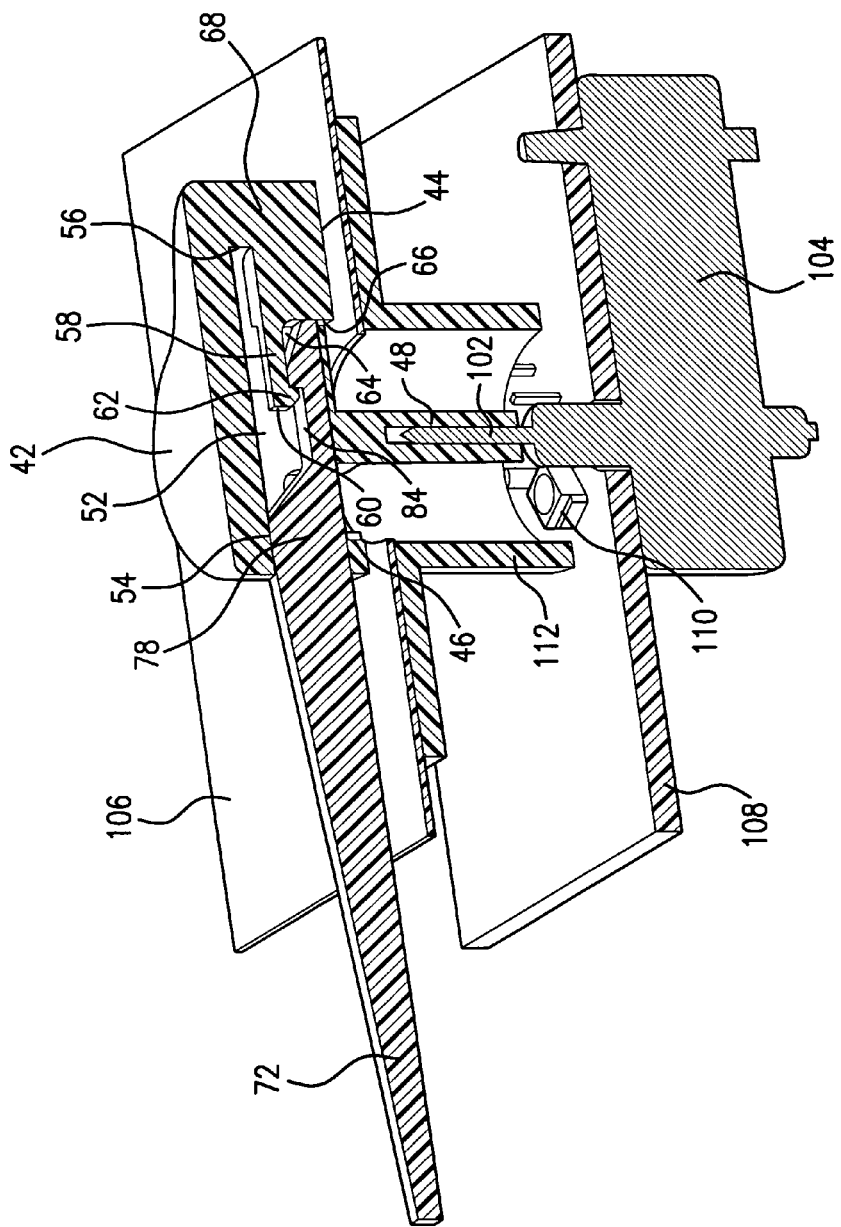
FIG. 4 is a cross-sectional view of a pointer and hub device according to the present invention, in combination with a display, printed circuit board and pointer drive motor.
Figure 5:
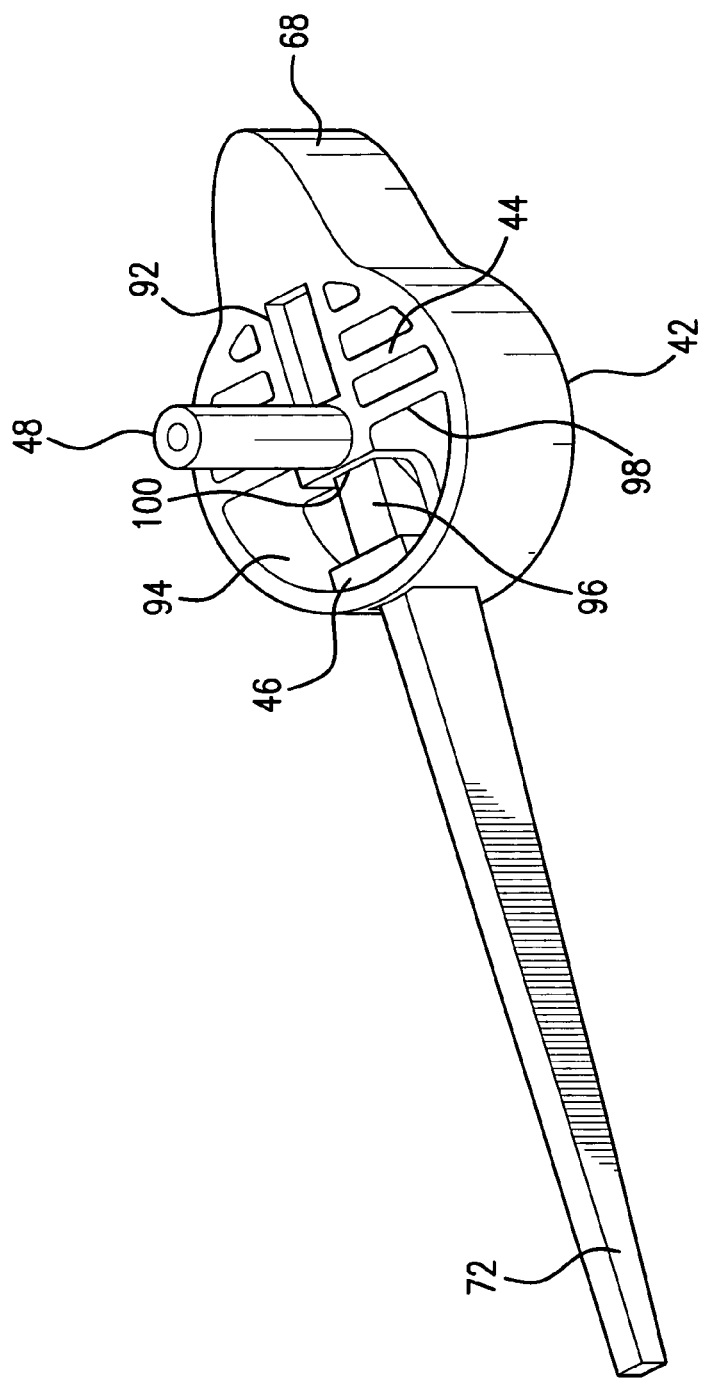
FIG. 5 is an underside view of the assembled pointer and hub device according to the present invention.

Referring now to FIGS. 3-5, various views of a pointer and hub device, in combination with display, lighting and drive components (FIG. 4), illustrate the current invention. The hub device or body 40 is a one-piece member or part including a cover portion or cap 42, an underside 44, a light shield 46, and a hollow pointer stem 48 extending at a right angle from the underside. The cap 42 and light shield 46 have an opening 50 that leads to an interior chamber or passage 52 in the hub device. The light shield 46 has the general configuration of a jutting, short rim or lip beneath the opening 50 and passage 52. The passage 52 has a first end 54 adjacent the opening 50 and an opposite second end 56. A flexible latch element in the form of a tab or arm 58 is cantilevered from the second end 56 of the passage and extends back toward the first end 54, in a plane generally perpendicular to the pointer stem 48. The arm 58 has a free end 60 located approximately mid-way along the passage 52. A shaped bulge or protrusion 62 on the free end 60 of the arm 58 faces away from the cap 42 toward the pointer stem 48 or underside 44 of the device. This direction is downward as viewed in FIG. 4, and a pocket 64 is formed beneath the arm 58 and above the underside 44. The pocket 64 has a stop surface 66.

The hub device 40 is molded or otherwise manufactured from an opaque plastic material like polyoxymethylene as one singular, undivided part. Therefore, the cap, light shield and stem provide an integrated component, integrally joined. A longitudinal axis of the passage 52 is perpendicular to the pointer stem 48. The pointer cap 42 is substantially circular in contour except for a projection 68 directly opposite the opening 50. The projection 68 is parabolic in shape and substantially solid to act as a counterweight for balancing a pointer or pointer blade 70. The projection 68 provides the second end 56 of the passage 52, such that the arm 58 actually extends from the projection, as best shown in FIG. 4.

A pointer blade 70 for insertion into the hub device 40 has an indicating section 72 for pointing to parameters in the form of numbers or other indicia printed on or otherwise applied to a dial or display surface beneath the pointer blade. The pointer blade 70 further includes an insertion section 74 integral with the indicating section 72 for receipt by the hub device 40. The indicating section 72 is relatively narrow at a measured parameter designating end 76 of the pointer blade and thickens or widens as it approaches the insertion section 74. The pointer blade 70 has a relatively short portion 78 with a rectangular cross-section where the indicating section 72 and insertion section 74 integrally connect, as best illustrated in FIG. 3. The opening 50 in the hub device 40 has a similar shape and size. The insertion section 74 then has a taper or slope 80 to a relatively narrow segment 82 for sliding beneath the arm 58 into the pocket 64 within the hub body 40. A top or upper surface of the segment 82 includes a corresponding or complementary catch or latch element in the form of a groove or slot 84 and a substantially right-angled hook or catch surface 86 for receiving or contacting the protrusion 62 on the free end 60 of the arm 58. This secures the insertion section 74, and thereby the pointer blade 70, to the hub device 40.

The segment 82 of the insertion section 74 of the pointer blade 70 has an end 88 with a chamfer or bevel 90. When the insertion section 74 of the pointer blade 70 is received through the opening 50 into the passage 52 of the hub body 40, the bevel 90 on the end 88 of the segment 82 acts on the protrusion 62 to first deflect the arm 58 upward until the protrusion enters the slot 84 and the arm snaps back to an un-deflected condition. Simultaneously, the end 88 abuts against the stop surface 66 in the pocket 64, preventing the pointer blade 70 from being pushed too far into the hub device 40 and restricting inadvertent vibration or movement of the pointer blade.

The arm 58 on the hub device 40 with the protrusion 62 and the slot 84 in the insertion section 74 of the pointer blade 70 together form a lock means enabling the pointer to be snap-fit into the hub device body. Other types of automatic or mechanical lock means, complementary latch elements or snap-together features could be used in place of those illustrated. For example, the deflectable arm could alternatively be part of the insertion section of the pointer, with the slot or receiving hole being part of the interior of the hub body. Or entirely different snap-together features could be substituted. The drawings are only meant to illustrate one possible unique, workable, reliable attachment structure.

As best shown in FIG. 5, the underside 44 of the hub body 40 has a window 92 for enabling an assembler to view and determine whether the insertion section 74 of the pointer blade 70 has been completely inserted into the hub body and the end 88 of the segment 82 is very close to or abuts against the stop surface 66, depending upon tolerances. The assembler should also hear an audible click when the protrusion 62 on the arm 58 snaps into the slot 84 in the segment 82. There is also an open cavity 94 in the hub body 40 that exposes a bottom area 96 of the insertion section 74 of the pointer blade 70 to act as a light pick-up area as will be further explained. The light pick-up area 96 is adjacent to the light shield 46. The pointer stem 48 protrudes or extends from a wall 98 that intersects the passage 52 near a center of the hub body 40. The wall 98 has an aperture 100 through which the passage 52 extends.

The pointer stem 48 receives or fits around a drive shaft 102 extending from a drive device, such as a stepper motor 104 (FIG. 4). The stepper motor 104 is electronically controlled to rotationally position the indicating section 72 of the pointer blade 70 at locations around a display 106, for example a dial or appliqué, beneath the pointer blade. The locations correspond to indicia (not shown) applied on the display. The stepper motor 104 is mounted beneath a printed circuit board (PCB) 108 under the display 106. Light sources, for example light emitting diodes 110 (only one is illustrated) mounted on the PCB 108 transmit light to the pointer blade 70. The light is controlled by a chimney or cylindrical reflecting wall 112. Light that enters the pointer blade 70 through light pick-up area 96 for transmission along its length is prevented from being diverted or reflected onto the display beneath the hub device by the light shield 46.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A pointer assembly for a display, the pointer assembly comprising:
   a pointer blade having an indicating section at a first end and an insertion section at a second end, the insertion section having a slot;
   a one-piece member including a pointer cap for covering the insertion section of the pointer blade, a light shield on an underside of the member to prevent light from reflecting off the underside of the member onto the display, and a stem extending from the underside for connecting the assembly to a drive shaft;
   an opening in the light shield leading to a passage within the member; and
   the member having a deflectable arm extending into the passage, the deflectable arm having a free end with a protrusion for snapping into the slot of the insertion section of the pointer blade to secure the pointer blade to the one-piece member.

2. The pointer assembly of claim 1 wherein the light shield includes a lip extending beneath the opening.

3. The pointer assembly of claim 1 wherein the one-piece member includes a solid projection extending from the one-piece member opposite the opening for providing a counterweight to the pointer blade.

4. The pointer assembly of claim 3 wherein the projection is parabolic in shape.

5. The pointer assembly of claim 1 further comprising a cavity in the underside of the one-piece member adjacent the light shield to expose a portion of the insertion section of the pointer blade as a light pick-up area.

6. The pointer assembly of claim 1 further comprising a window in the underside of the one-piece member for viewing part of the passage and providing a visual indication of complete receipt of the insertion section of the pointer blade into the passage.

7. A pointer assembly for a display, the pointer assembly comprising:
- a pointer blade having an indicating section at a first end and an insertion section at a second end, the insertion section having a catch element;
- a one-piece member including a pointer cap for covering the insertion section of the pointer blade, a light shield on an underside of the member to prevent light from reflecting off the underside of the member onto the display, and a stem extending from the underside for connecting the assembly to a drive shaft;
- an opening in the light shield leading to a passage within the member;
- the member having a latch element extending into the passage for cooperating with the catch element on the pointer blade to secure the pointer blade to the one-piece member;
- wherein the insertion section tapers to a relatively narrow segment containing the catch element of the insertion section, and the member includes a stop surface beneath the latch element against which the segment abuts as the latch and catch elements cooperate.

8. The pointer assembly of claim 7 wherein the segment has a beveled end for initially deflecting the latch element of the member.

9. The pointer assembly of claim 7 wherein the stop surface is in a pocket under the latch element of the member for receiving the segment.

10. A pointer assembly for a display, the pointer assembly comprising:
- a pointer blade having an indicating section at a first end and an insertion section at a second end, the insertion section having a catch element;
- a one-piece member including a pointer cap for covering the insertion section of the pointer blade, a light shield on an underside of the member to prevent light from reflecting off the underside of the member onto the display, and a stem extending from the underside for connecting the assembly to a drive shaft;
- an opening in the light shield leading to a passage within the member, the pointer stem protruding from a wall intersecting the passage; and
- the member having a latch element extending into the passage for cooperating with the catch element on the insertion section of the pointer blade to secure the pointer blade to the one-piece member.

11. The pointer assembly of claim 10 wherein the wall has an aperture through which the passage extends.

* * * * *